US008880519B2

(12) United States Patent
Roshen (10) Patent No.: US 8,880,519 B2
(45) Date of Patent: *Nov. 4, 2014

(54) DETERMINATION OF A SERVICE DESCRIPTION MOST CLOSELY MATCHING A SPECIFIED SERVICE NAME

(71) Applicant: International Business Machines Corporation, Armonk, NY (US)

(72) Inventor: Waseem A. Roshen, Hilliard, OH (US)

(73) Assignee: International Business Machines Corporation, Armonk, NY (US)

( * ) Notice: Subject to any disclaimer, the term of this patent is extended or adjusted under 35 U.S.C. 154(b) by 7 days.

This patent is subject to a terminal disclaimer.

(21) Appl. No.: 13/866,089

(22) Filed: Apr. 19, 2013

(65) Prior Publication Data

US 2013/0232141 A1 Sep. 5, 2013

Related U.S. Application Data

(63) Continuation of application No. 13/039,368, filed on Mar. 3, 2011, now Pat. No. 8,478,753.

(51) Int. Cl.
*G06F 17/30* (2006.01)
(52) U.S. Cl.
CPC ...... *G06F 17/3053* (2013.01); *G06F 17/30017* (2013.01); *G06F 17/30675* (2013.01)
USPC .......................................... 707/728; 707/796
(58) Field of Classification Search
USPC ......... 707/723, 728, 748, 752, 758, 765, 766, 707/796
See application file for complete search history.

(56) References Cited

U.S. PATENT DOCUMENTS

| 6,023,701 A | 2/2000 | Malik et al. |
| 6,438,556 B1 | 8/2002 | Malik et al. |
| 7,124,062 B2 | 10/2006 | Gebhart |
| 7,321,919 B2 | 1/2008 | Jacobs et al. |

(Continued)

FOREIGN PATENT DOCUMENTS

| EP | 1855218 | 11/2007 |
| WO | 2006110684 | 10/2006 |
| WO | 2006113092 | 10/2006 |
| WO | 2008078366 | 12/2006 |

OTHER PUBLICATIONS

Papazoglou et al., Service oriented architectures: approaches, technologies and research issues, 2007, Google Scholar, 389-415.*

(Continued)

*Primary Examiner* — Jean B Fleurantin
(74) *Attorney, Agent, or Firm* — Schmeiser, Olsen & Watts, LLP; John R. Pivnichny (57) ABSTRACT

A method and system for determining a service description that most closely matches a service name. A ranked service name list is generated by use of a name parser, a dictionary, and a name composer, wherein the ranked service name list comprises at least one alternative service name and a respective rank of each alternative service name of the at least one alternative service name, and wherein the respective rank indicates how closely the alternative service name associated with the respective rank resembles the service name provided by the user. It is ascertained that the service description matches the highest ranked alternative service name in the service name list. The service description matching the highest ranked alternative service name is communicated to the user.

20 Claims, 8 Drawing Sheets

(56) References Cited

U.S. PATENT DOCUMENTS

| | | | |
|---|---|---|---|
| 7,676,472 B2 | 3/2010 | Kurhekar et al. | |
| 7,966,320 B2 | 6/2011 | Roshen | |
| 7,996,394 B2 | 8/2011 | Roshen | |
| 8,224,840 B2 * | 7/2012 | Bao et al. | 707/769 |
| 2002/0052948 A1 | 5/2002 | Baudu et al. | |
| 2002/0174262 A1 | 11/2002 | Marcos et al. | |
| 2004/0236780 A1 | 11/2004 | Blevins et al. | |
| 2005/0278410 A1 | 12/2005 | Espino | |
| 2006/0248176 A1 | 11/2006 | McDowall | |
| 2008/0250097 A1 | 10/2008 | Angelini et al. | |
| 2011/0125776 A1 | 5/2011 | Roshen | |
| 2012/0124076 A1 | 5/2012 | Roshen | |

OTHER PUBLICATIONS

Thomas Phan et al., A Request-Routing Framework for SOA-Based Enterprise Computing, Aug. 23-28, 2008, ACM, 996-1007.*
Notice of Allowance (Mail Date Nov. 30, 2011) for U.S. Appl. No. 12/625,250, filed Nov. 24, 2009; Confirmation No. 9872.
Office Action (Mail Date Jan. 3, 2012) for U.S. Appl. No. 12/945,337, filed Nov. 12, 2010; Confirmation No. 7540.
Onstine et al.; Build SOA with Web services using WebSphere Studio, Part 1: Introduction to SOA nad Web services, Website, Internet Article, Nov. 11, 2004, Whole document, Retrieved from the Internet: URL: http://www.ibm.com/developerworks/webservices/tutorials/ws-soa-1/ (Form PTO-892 filed in conjuction with Office Action (Mail Date Jan. 3, 2012) for U.S. Appl. No. 12/945,337, filed Nov. 12, 2010; Confirmation No. 7540).
Lausen et al.; Survey of Current Means to Discover Web Services; Semantic Technology Institute (STI) Aug. 2008; 15 pages.
Ahmadi et al.; Flexible Matching and Ranking of Web Service Advertisements; Nov. 2007; 22 pages.
Mokhtar et al.; Interoperable Semantic & Tyntactic Service Matching for Ambient Computing Environments; Aug. 2008; 11 pages.
Bai et al.; Resource Matching and a Matchmaking Service for an Intelligent Grid; International Conference on Computational Intelligence 2004; 4 pages.
Corrales et al.; BeMatch: A Platform for Matchmaking Service Behavior Models; Mar. 2008; 5 pages.
Medjahed et al.; Composing Web Services on the Semantic Web; The VLDB Journal (2003); pp. 333-351.
Nawaz et al.; SEMREG-PRO: A Semantic based Registry for Proactive Web Service Discovery using Publish-Subscribe Model; Fourth International Conference on Semantics, Knowledge and Grid, IEEE 2008; pp. 301-308.
Roshen, Waseem, Ph. D., "Service Registry with Advanced Search Capability, Part 1: Concepts, Process, and Components", Internet Article Dated Nov. 6, 2009, pp. 1-9. [retrieved from http://public.dhe.ibm.com/software/dw/webservices/ws-SOAregadvsearch/ws-SOAregadvsearch-pdf.pdf on Jan. 11, 2011].
Balani, Naveen, "Model and Build ESB SOA Frameworks", Internet Article Dated Mar. 15, 2005, pp. 1-4. [retrieved from http://www.ibm.com/developerworks/web/library/wa-soaesb/ on Jan. 12, 2011].
International Search Report for PCT/EP2010/066559, Dated Jan. 27, 2011. 5 pages.
U.S. Appl. No. 12/625,250, filed Nov. 24, 2009; Confirmation No. 9872.
Notice of Allowance (Mail Date Mar. 22, 2011) for U.S. Appl. No. 12/174,944, filed Jul. 17, 2008; Confirmation No. 9687.
Amendment filed Apr. 27, 2012 in response to Office Action (Mail Date Jan. 3, 2012) for U.S. Appl. No. 12/945,337, filed Nov. 12, 2010; Confirmation No. 7540.
Notice of Allowance (Mail Date Aug. 30, 2012) for U.S. Appl. No. 12/945,337, filed Nov. 12, 2010; Confirmation No. 7540.
Office Action (Mail Date Sep. 6, 2012) for U.S. Appl. No. 12/945,151, filed Nov. 12, 2010; Confirmation No. 7151.
U.S. Appl. No. 13/609,675, filed Sep. 11, 2012; Confirmation No. 3370.

* cited by examiner

```
L101:   <definitions name="globalWeatherService"
L102:     targetNamespace=http://globService.com/ns/globalWeather/wsdl
L103:     xmlns:tns=http://globalService.com/globalWeather/wsdl
L104:     xmlns:SOAP-EXT=http://schemas.xmlsoap.org/wsdl/soap/
L105:     xmlns=http://schemas.xmlsoap.org/wsdl/>

L106:   <types>
L107:   <schema targetNamespace=
                    http://globalService.com/ns/globalWeather/wsdl
L108:         xmlns=http://www.w3.org/2001/XMLSchema>
L109:       <complexType name="inputType">
L110:         <sequence>
L111:           <element name="City" type="xsd:string"/>
L112:           <element name="State"  type="xsd:string"/>
L113:           <element name="Country" type="xsd:string"/>
L114:         </sequence>
L115:       </complexType>
L116:       <complexType name="outputType">
L117:         <sequence>
L118:           <element name="temperature" type="xsd:int">
L119:           <element name="condition" type="xsd:string">
L120:           <element name="windSpeed"  type="xsd:decimal">
L121:           <element name="windDirection" type="xsd:string">
L122:         </sequence>
L123:       </complexType>
L124:   </schema>
L125:   </types>

L126:   <message name="inputParameters">
L127:       <part name ="input" type="inputType"/>
L128:   </message>

L129:   <message name="outputParameters">
L130:       <part name="output" type="outputType"/>
L131:   </message>

L132:   <portType name="weatherServicePortType">
L133:       <operation name="getWeather">
L134:           <input message="tns:inputParameters"/>
L135:           <output message="tns:outputParameters"/>
L136:       </operation>
L137:   </portType>
```

FIG. 5

| Constituent word | Get | Car | Price |
|---|---|---|---|
| Synonym 1 | Obtain | Automobile | Cost |
| Synonym 2 | Fetch | Vehicle | Charge |
| Synonym 3 | ... | ... | ... |
| .. | ... | ... | ... |

FIG. 6A

| Constituent word (weight) | Get (103) | Car (102) | Price (101) |
|---|---|---|---|
| Synonym 1 | Obtain(0) | Automobile(0) | Cost(0) |
| Synonym 2 | Fetch(0) | Vehicle(0) | Charge(0) |
| Synonym 3 | ... | ... | ... |
| .. | ... | ... | ... |

FIG. 6B

| Alternative Service Name | Calculation | Rank |
|---|---|---|
| getCarCharge | 103+102+0 | 205 |
| getCarCost | 103+102+0 | 205 |
| getAutomobilePrice | 103+0+101 | 204 |
| getAutomobileCost | 103+0+0 | 103 |
| getVehiclePrice | 103+0+101 | 204 |
| ... | ... | ... |
| FetchCarPrice | 0+102+101 | 203 |
| ... | ... | ... |
| ObtainCarPrice | 0+102+101 | 203 |
| ... | ... | ... |

FIG. 6C

| Alternative Service Name | Rank |
|---|---|
| getCarCharge | 205 |
| getCarCost | 205 |
| getAutomobilePrice | 204 |
| getVehiclePrice | 204 |
| FetchCarPrice | 203 |
| ObtainCarPrice | 203 |
| ... | ... |
| getAutomobileCost | 103 |
| ... | ... |

DETERMINATION OF A SERVICE DESCRIPTION MOST CLOSELY MATCHING A SPECIFIED SERVICE NAME

This application is a continuation application claiming priority to Ser. No. 13/039,368, filed Mar. 3, 2011, now U.S. Pat. No. 8,478,753, issued Jul. 2, 2013.

CROSS-REFERENCE TO RELATED APPLICATIONS

This invention is related to U.S. patent application Ser. No. 12/174,944 entitled "SYSTEM AND METHOD FOR PERFORMING ADVANCED SEARCH IN SERVICE REGISTRY SYSTEM", filed on Jul. 17, 2008, now U.S. Pat. No. 7,996,394, issued Aug. 9, 2011, U.S. patent application Ser. No. 12/175,552 entitled "SYSTEM AND METHOD FOR IMPROVING NON-EXACT MATCHING SEARCH IN SERVICE REGISTRY SYSTEM WITH CUSTOM DICTIONARY", filed on Jul. 18, 2008, now U.S. Pat. No. 7,966,320, issued Jun. 21, 2011, U.S. patent application Ser. No. 12/945,151 entitled "SEARCH CAPABILITY ENHANCEMENT IN SERVICE ORIENTED ARCHITECTURE (SOA) SERVICE REGISTRY SYSTEM", filed on Nov. 12, 2010, and U.S. patent application Ser. No. 12/945,337 entitled "SERVICE ORIENTED ARCHITECTURE (SOA) SERVICE REGISTRY SYSTEM WITH ENHANCED SEARCH CAPABILITY", filed on Nov. 12, 2010, now U.S. Pat. No. 8,352,491, issued Jan. 8, 2013.

BACKGROUND

Aspects of present invention disclose a system and associated method for automatically performing advanced searches for a service description in a service-oriented architecture (SOA) service registry system. Conventional SOA service registry systems require users to provide an exact service name to search for a specific service description published in a registry of the SOA registry system. Also, because conventional SOA service registry systems have tightly coupled processing components, it is difficult to improve functionality and/or performance of conventional SOA service registry systems in a scalable fashion.

BRIEF SUMMARY

According to one embodiment of the present invention, a method for advanced searching of a service registry for a service description that is most closely matches a service name provided by a user comprises: receiving the service name, by a processor of a computer on which a Service Oriented Architecture (SOA) service registry system runs, wherein the SOA service registry system comprises the service registry, a name parser, a dictionary, and a name composer, and wherein the service registry comprises at least one service description searchable by a respectively associated service name; determining that the service name does not have the service description that is an exact match to the received service name in the service registry; generating a ranked alternative service name list by use of the name parser, the dictionary, and the name composer, wherein the ranked alternative service name list comprising at least one alternative service name and a respective rank of each alternative service name of said at least one alternative service name, wherein the respective rank indicates how closely the alternative service name associated with the respective rank resembles the service name provided by the user; ascertaining that the service description matches the highest ranked alternative service name in the alternative service name list by searching the service registry with said at least one alternative service name in a descending order of the respective ranks of said at least one alternative service name; and communicating the service description matching the highest ranked alternative service name to the user.

According to one embodiment of the present invention, a computer program product comprises a computer readable memory unit that embodies a computer readable program code. The computer readable program code contains instructions that, when run by a processor of a computer system, implement advanced searching of a service registry for a service description that is most closely matches a service name provided by a user.

According to one embodiment of the present invention, a computer system comprises a processor, a memory coupled to the processor, and a computer readable storage device coupled to the processor, said storage device containing program code configured to be executed by the processor via the memory to implement advanced searching of a service registry for a service description that is most closely matches a service name provided by a user.

According to one embodiment of the present invention, a process for supporting computer infrastructure, said process comprising providing at least one support service for at least one of creating, integrating, hosting, maintaining, and deploying computer-readable code in a computing system, wherein the code in combination with the computing system is capable of performing advanced searching of a service registry for a service description that is most closely matches a service name provided by a user.

BRIEF DESCRIPTION OF THE SEVERAL VIEWS OF THE DRAWINGS

FIG. 5 is an example listing of a service oriented architecture (SOA) service description written in the Web Services Description Language (WSDL), in accordance with the embodiments of the present invention.

DETAILED DESCRIPTION

Figure 1:
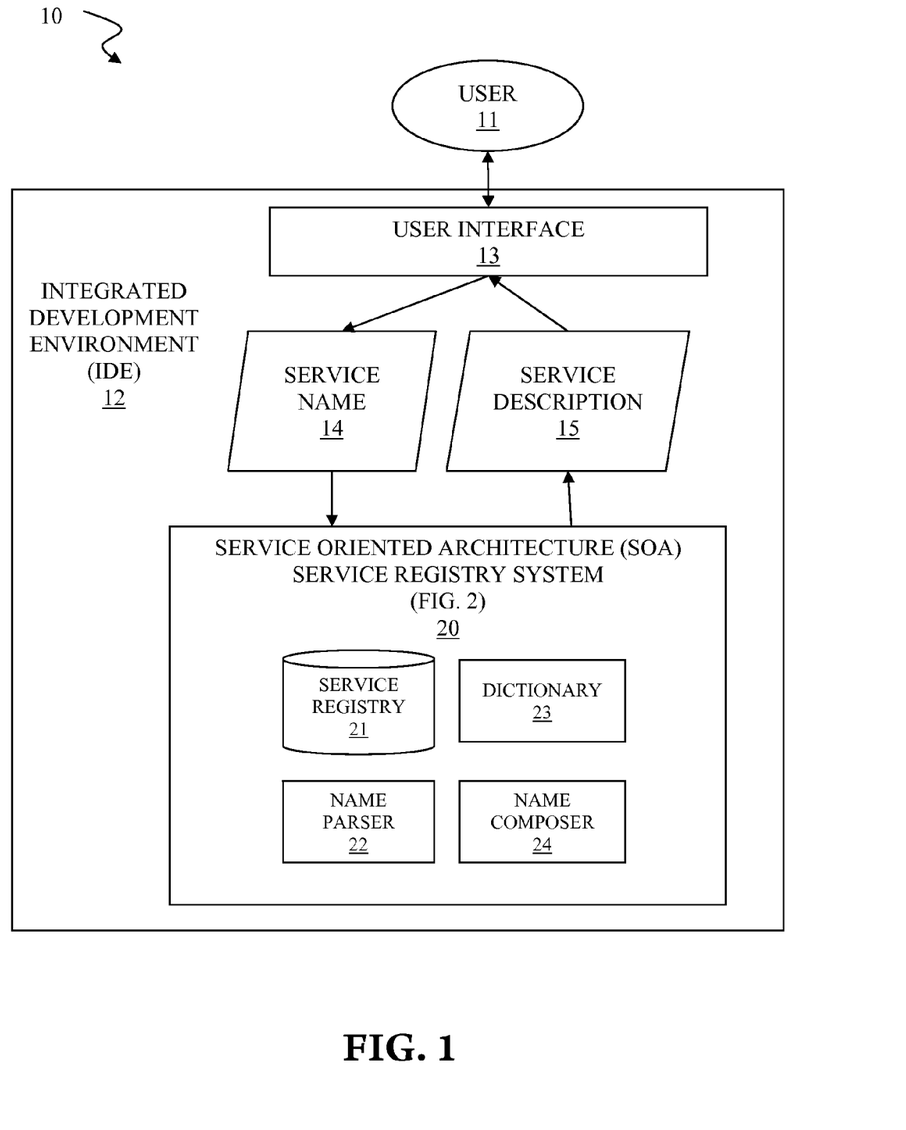
FIG. 1 illustrates a system for advanced searching of a web service registry for a service description that is most closely associated with a service name provided by a user, in accordance with embodiments of the present invention.

FIG. 1 illustrates a system 10 for searching of a web service registry for a service description 15 that is most closely associated with a service name 14 provided by a user 11, in accordance with embodiments of the present invention.

The system 10 comprises the user 11 and an integrated development environment (IDE) 12 in which the user 11 is developing a service-oriented architecture (SOA) business application and/or a software project comprising the SOA business application. The SOA business application utilizes at least one SOA service registry entry {service name, service description}, in which each service name uniquely identifies a respective service description. Each service description comprises information necessary to provide a SOA service identified by a respective service name within each SOA service registry entry. In this specification, terms "SOA service," "web service," and "service" are used interchangeably.

The IDE 12 comprises a user interface 13 and a service-oriented architecture (SOA) service registry system 20. Examples of the user interface 13 may be, inter alia, application programming interface (API), a graphical user interface to receive a web service name to search an associated web service description, etc., and combinations thereof.

The SOA service registry system 20 comprises said at least one SOA service registry entry {service name, service description} and components facilitating a search of the service description 15 by use of a service name 14 that is associated with the service description 15 in a particular service registry entry. The SOA service registry system 20 is configured to look up the service description 15 with the service name 14 provided by the user 11.

The user 11 provides the service name 14 as an input to the SOA service registry system 20 through the user interface 13 to search the service description 15 corresponding to the service name 14. The user 11 receives the service description 15 comprising a service name value that matches the service name 14 if the service description 15 is found in the SOA service registry system 20. The user 11 receives a null wherein no service description comprising a service name value that matches the service name 14 is found in the SOA service registry system 20.

The service description 15 comprises development time information, a communication protocol and a message format. An example of the development time information may be, inter alia, operations exposed by a given service, etc. Examples of the communication protocol may be, inter alia, the Hypertext Transfer Protocol (HTTP), Internet Inter-Orb Protocol (IIOP), Java Remote Method Protocol (JRMP), Java Message Service (JMS) protocol, etc. An example of the message format may be, inter alia, the Simple Object Access Protocol (SOAP), etc. The service description 15 may further comprise runtime information such as the IP address and port number for a given service implementation. Web Service Description Language (WSDL) is usually employed to describe a SOA service. See FIG. 5, infra, for an example of the service description for a SOA service registry entry written in Web Services Description Language (WSDL) format.

The SOA service registry system 20 comprises a service registry 21, a name parser 22, a dictionary 23, and a name composer 24. The SOA service registry system 20 publishes service descriptions and searches published service descriptions with a respective service name. The SOA service registry system 20 of the present invention locates the service description 15 that is associated with a service name that is either identical to the service name 14 or an alternative service name that is most similar to the service name 14 wherein the service registry 21 does not have an exact match for the service name 14.

The service registry 21 receives the service name 14 from the user interface 13 and returns the service description 15 to the user interface 13 if the service description 15 matching the service name 14 exists in the service registry 21. The service registry 21 also performs searches for alternative service names generated by the name composer 24 and produces multiple service descriptions found as matching the alternative service names existing in the service registry 21.

The service registry 21 stores previously registered at least one service description that is searchable by a respective service name. The service registry 21 utilizes the service name 14 as a key to search entries of the service registry 21 for the service description 15 associated with the service name 14. The service registry 21 may be implemented by used of a conventional SOA service registry system, enabling the advanced search functionality described in this specification for such conventional SOA service registry system.

Figure 4:
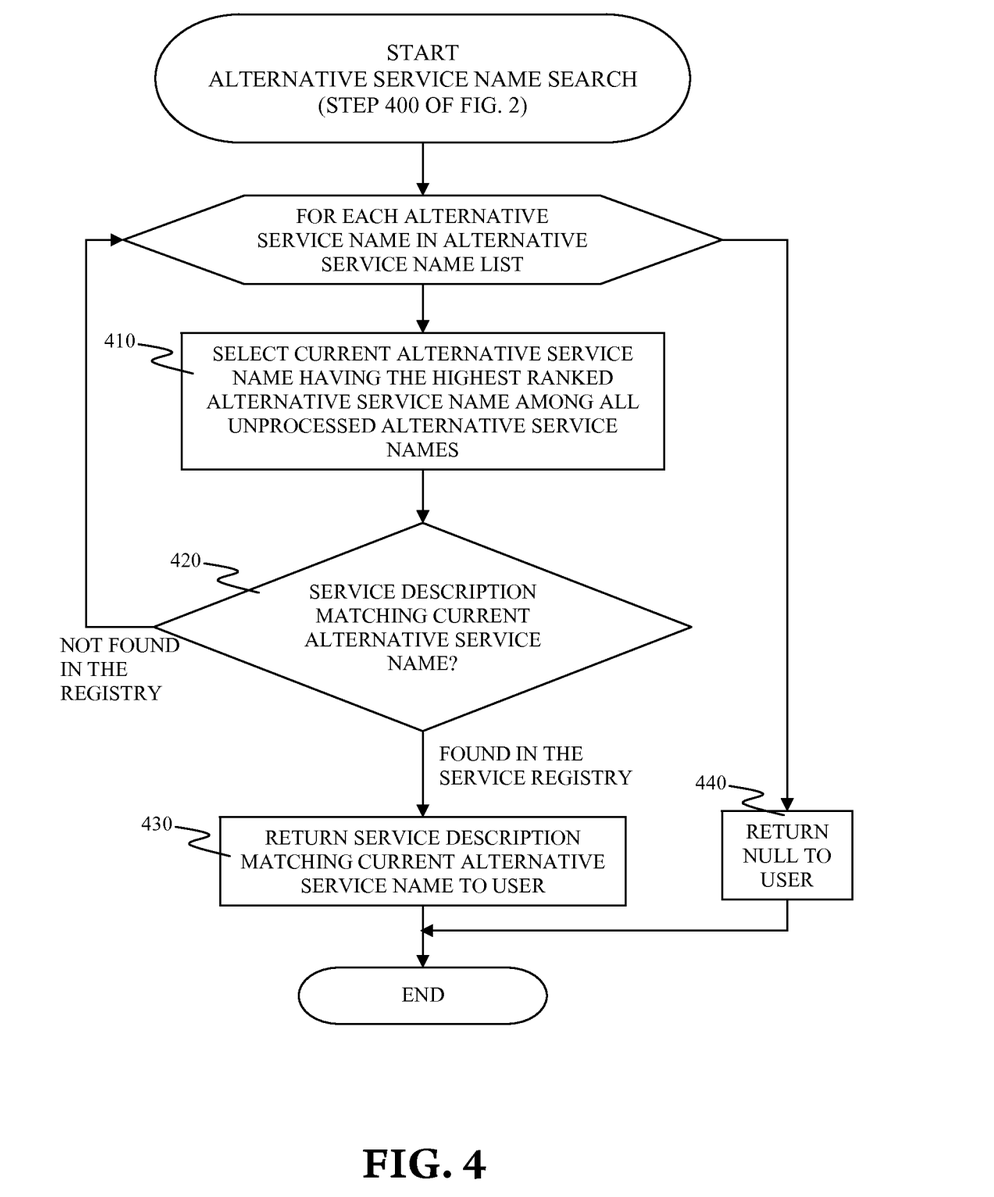
FIG. 4 is a flowchart depicting a method for searching the service registry in order of ranks in the alternative service name list resulting in locating a service description comprising the alternative service name that is most closely associated with the service name input by the user, performed in step 400 of FIG. 2 by the SOA service registry system, in accordance with the embodiments of the present invention.

The name parser 22 generates a constituent word list from the service name 14, which lists at least one word constitutes the service name 14. Each word is distinguished according to a shortest meaningful word listed in conventional dictionaries. For example, when the service name is "globalWeatherService", the name parser 22 generates the constituent word list {global, weather, service}, as shown in FIG. 4, infra. The name parser 22 returns the constituent word list to the search controller 25.

The dictionary 23 receives the constituent word list from the search controller 25. The dictionary 23 generates a respective synonym list for each word in the constituent word list generated by the name parser 22. The dictionary 23 returns the synonym list for each constituent word to the search controller 25.

The name composer 24 receives all synonym lists from the search controller 25. The name composer 24 generates a candidate service name list from the received synonym lists generated by the dictionary 23 such that the candidate service name list comprises at least one candidate service name that is not identical to the service name 14 but has a meaning similar to the service name 14.

Figure 2:
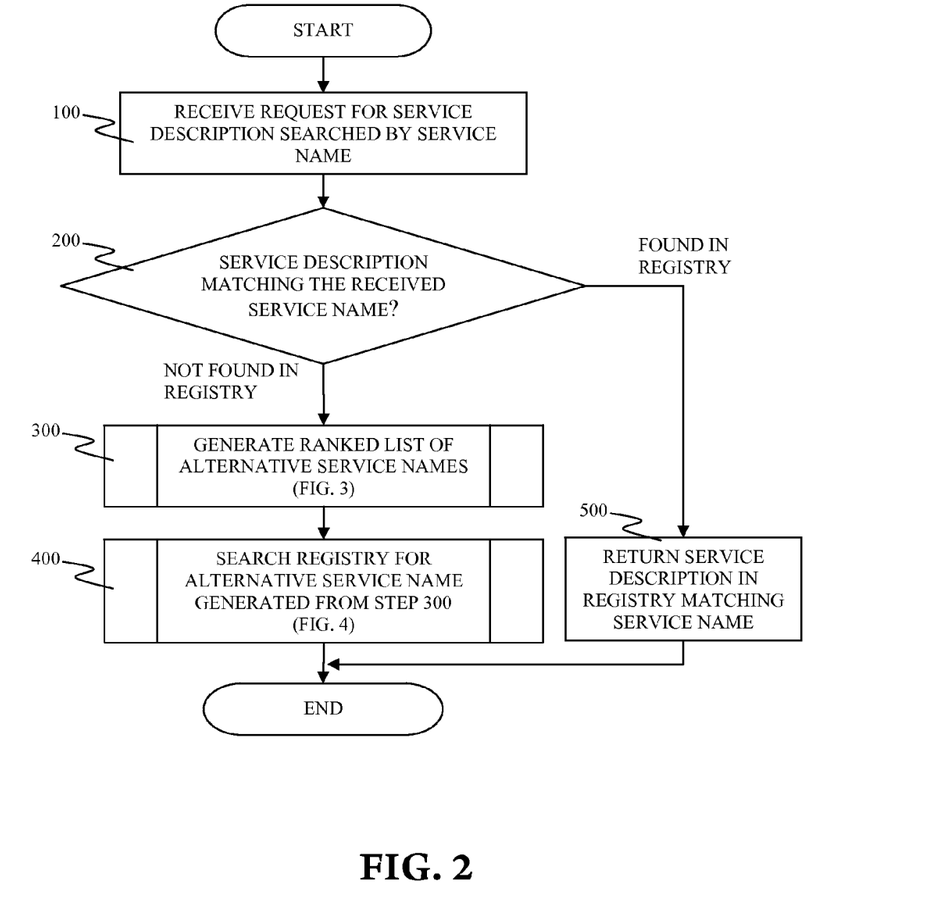
FIG. 2 is a flowchart depicting a method for searching of a web service registry for a service description that is most closely associated with a service name provided by a user, as performed by the SOA service registry system, in accordance with the embodiments of the present invention.

FIG. 2 is a flowchart depicting a method for searching of a web service registry for a service description that is most closely associated with a service name provided by a user, as performed by the SOA service registry system, in accordance with the embodiments of the present invention.

In step 100, the SOA service registry system receives a request to search a service description in the service registry with the service name provided by the user. Then the SOA service registry system proceeds with step 200.

In step 200, the SOA service registry system determines whether or not the service description comprising the service name in the request of step 100 supra exists in the service registry. If the SOA service registry system determines that the service registry does not have the service description comprising the service name in the request, then the SOA service registry system proceeds with step 300 for further search with alternative service names because there is no service description exactly matching the received service name. If the SOA service registry system determines that the service registry has the service description comprising the service name in the request, then the SOA service registry system proceeds with step 500 because the service description is found as an exact match of the received service name and no further search is necessary.

In step 300, the SOA service registry system generates an alternative service name list based on the received service name to find a non-exact matching service description that is most closely associated with the service name. See descriptions of FIG. 3 infra for steps performed to generate the alternative service name list. Then the SOA service registry system proceeds with step 400.

In step 400, the SOA service registry system searches, in a predefined order, the service registry for alternative service names generated in the alternative service name list from step 300. In one embodiment of the present invention, the alternative service names in the alternative service name list are respectively associated with ranks indicating a respective degree of association with the service name that had been originally requested by the user. See descriptions of FIG. 4 infra for steps performed in searching the service registry with the alternative service names. Then the SOA service registry system terminates processing the search request.

In step 500, the SOA service registry system returns the service description found in the service registry from step 200 supra as the service description associated with the received service name is found in the service registry. Then the SOA service registry system terminates processing the search request.

Figure 3:
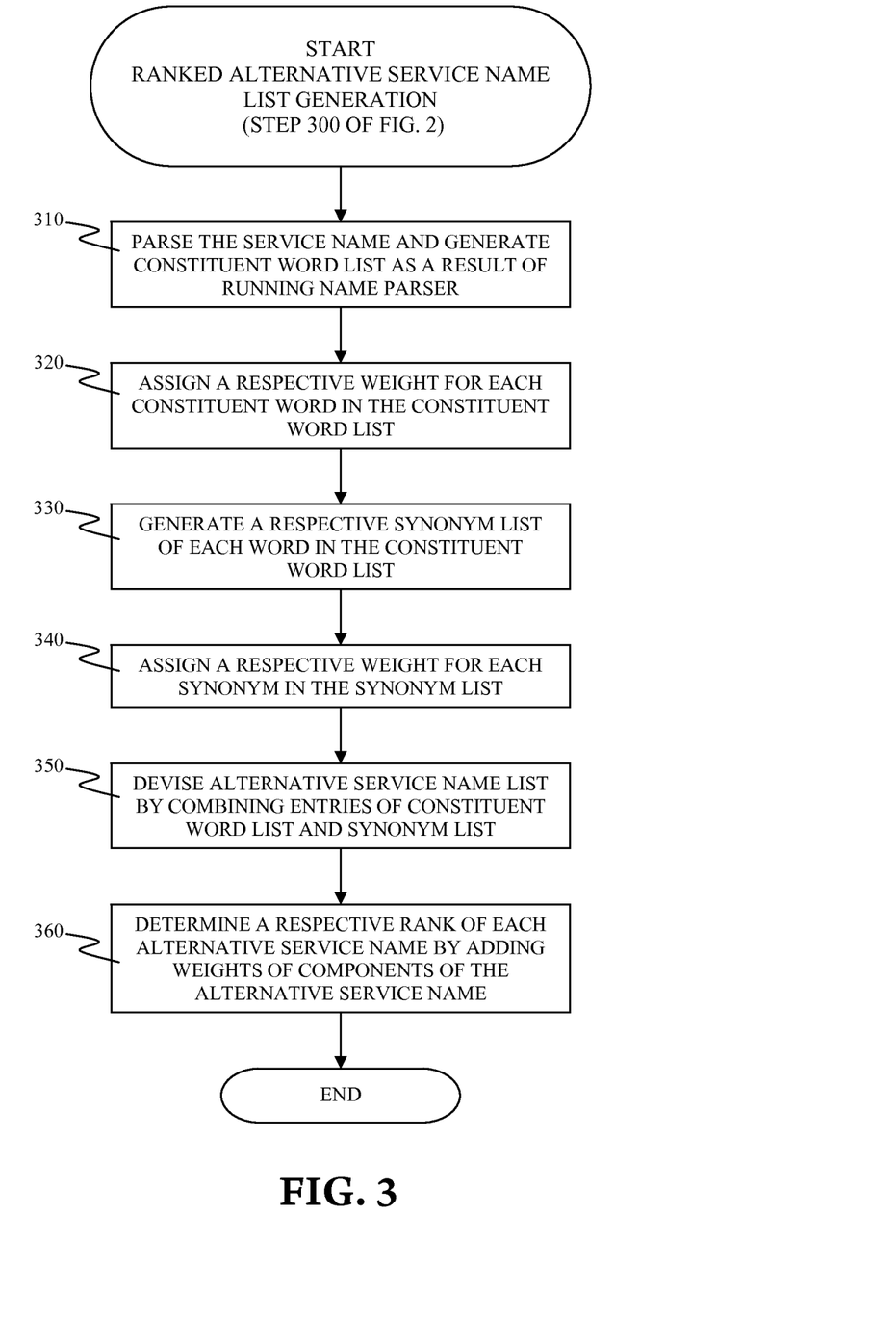
FIG. 3 is a flowchart depicting a method for generating a ranked alternative service name list, performed in step 300 of FIG. 2 by the SOA service registry system, in accordance with the embodiments of the present invention.

FIG. 3 is a flowchart depicting a method for generating a ranked alternative service name list, performed in step 300 of FIG. 2 supra by the SOA service registry system, in accordance with the embodiments of the present invention.

In step 310, the SOA service registry system parses the service name and generates a constituent word list as a result of running the name parser. As presented in the related patent applications noted above, the name parser receives the service name and parses the received service name. The name parser produces a constituent word list comprising all dictionary words appearing in the service name. In one embodiment of the present invention, upon receiving the service name "getCarPrice", the name parser produces a constituent word list {"get", "car", "price"}. In this specification and related patent applications, the terms "constituent word list" and "component word list" are used interchangeably. Then the SOA service registry system proceeds with step 320.

In step 320, the SOA service registry system assigns a respective weight for each constituent word in the constituent word list. In another embodiment of the present invention, the name parser returns a weighted constituent word list in step 310 and the SOA service registry system proceeds with step 330 without performing step 320. Then the SOA service registry system proceeds with step 330.

In step 330, the SOA service registry system generates a respective synonym list of each in the constituent word list by running the dictionary, as presented in the related patent applications. Then the SOA service registry system proceeds with step 340.

In step 340, the SOA service registry system assigns a respective weight for each synonym in the synonym list. In another embodiment of the present invention, the dictionary returns a weighted synonym list in step 330 and the SOA service registry system proceeds with step 350 without performing step 340. Then the SOA service registry system proceeds with step 350.

In step 350, the SOA service registry system devises an alternative service name list by combining entries of the weighted constituent word list and the weighted synonym list by running the name composer as presented in the related patent applications. In this specification and related patent applications, the terms "alternative service name" and "candidate service name" are used interchangeably. Then the SOA service registry system proceeds with step 360.

In step 360, the SOA service registry system determines a respective rank of each alternative service name by adding weights of component words of said each alternative service name generated in step 350. In another embodiment of the present invention, the name composer returns a ranked alternative service name list by adding weights of component words of said each alternative service name as the name composer generates each alternative service name of the alternative service name list. Then the SOA service registry system completes step 300 of FIG. 2 supra for generating the ranked alternative service name list and proceeds with step 400 of FIG. 2 supra.

FIG. 4 is a flowchart depicting a method for searching the service registry in order of ranks in the alternative service name list resulting in locating a service description comprising the alternative service name that is most closely associated with the service name input by the user, performed in step 400 of FIG. 2 supra by the SOA service registry system, in accordance with the embodiments of the present invention.

The SOA service registry system performs a loop comprising steps 410 through 440 for each alternative service name in the ranked alternative service name list, from a first alternative service name having a top rank among all alternative service names. The SOA service registry system returns a first-found service description as the service description that is most closely associated with the service name received from the user and terminated processing the search request. If the SOA service registry system does not locate a service description for a last alternative service name having a lowest rank in the alternative service name list, the SOA service registry system returns null to the user as there is no service description that is associated with the service name input by the user.

In step 410, the SOA service registry system selects a current alternative service name that has a highest rank among the alternative service names that had not yet been processed by the loop comprising steps 410 through 440. Then the SOA service registry system proceeds with step 420.

In step 420, the SOA service registry system determines if the service description matching the selected current alternative service name is found in the service registry. If the SOA service registry system determines that the service description matching the selected current alternative service name is found in the service registry, then the SOA service registry system proceeds with step 430. If the SOA service registry system determines that the service description matching the selected current alternative service name is not found in the service registry, then the SOA service registry system loops back to step 410 for a second alternative service name having a next highest rank within the alternative service name list.

In step 430, the SOA service registry system returns the located service description matching the current alternative service name to the user. Then the SOA service registry system terminated processing the search request for the service name input by the user.

In step 440, the SOA service registry system returns null (ø) as a response to the search request by use of the service name because there is no service description having a similar service name with the service name input by the user. Then the SOA service registry system terminated processing the search request for the service name input by the user.

FIG. 5 is an example listing of a service oriented architecture (SOA) service description written in the Web Services Description Language (WSDL), in accordance with the embodiments of the present invention.

In lines L101 through L105, various namespaces are declared. In lines L106 through L125, various data types are declared. In lines L126 through L131, message types are declared, which consist of an input message type and an output message type. In lines 132 through L137, various operations included in the web service are declared.

FIGS. 6A, 6B, 6C, and 6D illustrates an example sequence of performing the method for searching of a web service registry for a service description that is most closely associated with a service name provided by a user, as performed by the SOA service registry system, in accordance with the embodiments of the present invention.

Figure 6A:
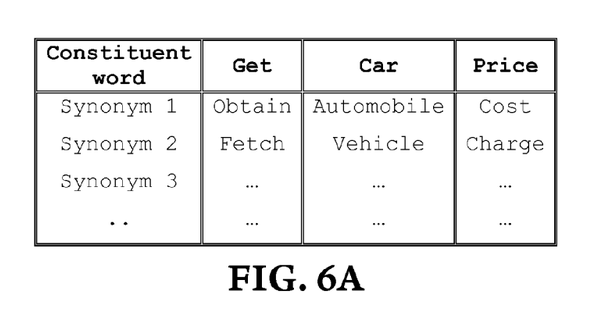
FIGS. 6A, 6B, 6C, and 6D illustrates an example sequence of performing the method for searching of a web service registry for a service description that is most closely associated with a service name provided by a user, as performed by the SOA service registry system, in accordance with the embodiments of the present invention.

The SOA service registry system receives an input service name of "GetCarPrice" from a user of the IDE.

After performing step 310, the SOA service registry system has a constituent word list consisting of "Get", "Car", and "Price". For each constituent word in the constituent word list, the SOA service registry system looks up synonyms by use of the dictionary. FIG. 6A depicts a result of the respective synonym list for all constituent words in the constituent word list wherein the input service name is "GetCarPrice".

Figure 6B:
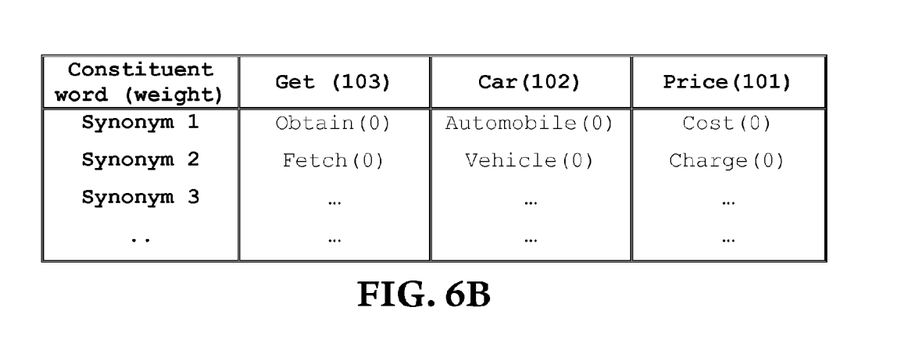

In one embodiment of the present invention, the SOA service registry system assigns a very greater weight for constituent words from the input service name than a synonym replacing a respective constituent word. FIG. 6B illustrates a set of weights assigned for the original constituent words and respective synonyms. A first constituent word "Get" has a weight of one hundred and three (103), while a first synonym of the first constituent word "Obtain" has a weight of zero (0). Proportion of weights of original constituent word and respective synonyms is similarly devised in cases of a second constituent word "Car", a third constituent word "Price" and their respective synonyms, as shown in FIG. 6B. A respective weight of each synonym is previously defined within the SOA service registry system, or interactively assigned by the user to represent a degree of associated between the constituent word and the synonym of the constituent word.

Figure 6C:
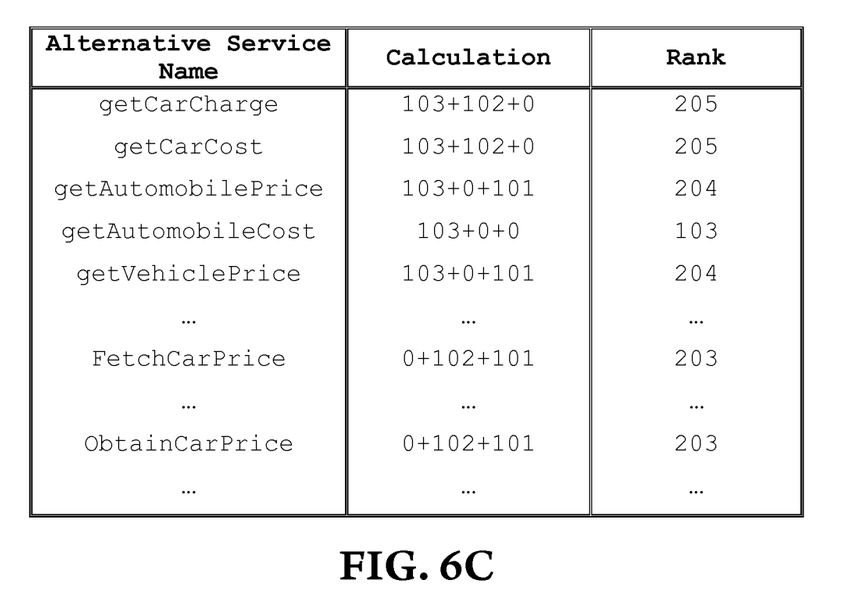

FIG. 6C illustrates a ranked alternative service name list generated after performing step 300 of FIG. 2 supra.

Figure 6D:
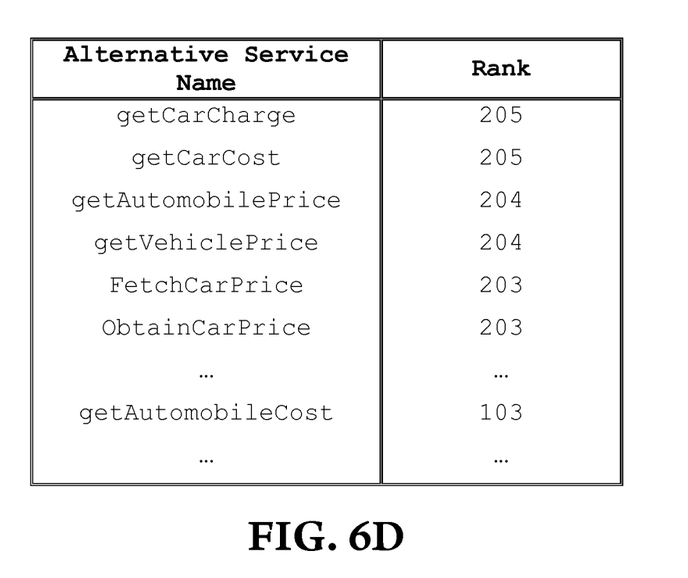

FIG. 6D illustrates a ranked alternative service name list having alternative service names appearing in order of respective ranks that enables a search of the service registry with the alternative service names without scanning the ranked alternative service name list to find a next highest ranked alternative service name as in step 410 of FIG. 4 supra. Wherein the SOA service registry system utilizes the ordered alternative service name list of FIG. 6D, the SOA service registry system selects a next entry in the ordered alternative service name list since the ranking comparison is previously performed.

Figure 7:
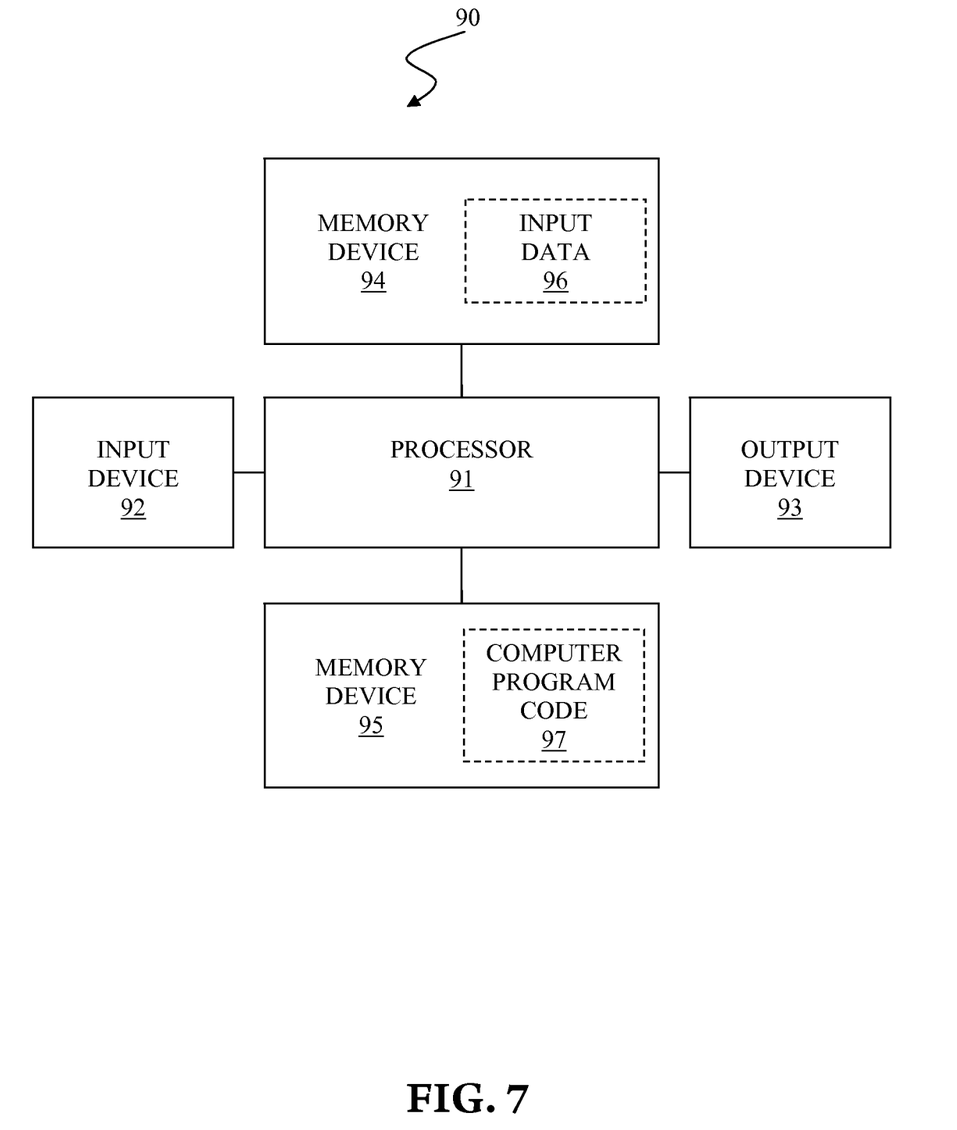
FIG. 7 illustrates a computer system used for advanced searching of a web service registry system for a closely matching service description for a service name input by a user of an integrated development environment (IDE), in accordance with the embodiments of the present invention.

FIG. 7 illustrates a computer system used for advanced searching of a web service registry system for a closely matching service description for a service name input by a user of an integrated development environment (IDE), in accordance with the embodiments of the present invention.

The computer system 90 comprises a processor 91, an input device 92 coupled to the processor 91, an output device 93 coupled to the processor 91, and memory devices 94 and 95 each coupled to the processor 91. In this specification, the computer system 90 represents any type of programmable data processing apparatus.

The input device 92 is utilized to receive input data 96 into the computer system 90. The input device 92 may be, inter alia, a keyboard, a mouse, a keypad, a touch screen, a scanner, a voice recognition device, a sensor, a network interface card (NIC), a Voice/video over Internet Protocol (VOIP) adapter, a wireless adapter, a telephone adapter, a dedicated circuit adapter, etc. The output device 93 is utilized to communicate results generated by the computer program code 97 to a user of the computer system 90. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc.

Any of the components of the present invention can be deployed, managed, serviced, etc. by a service provider that offers to deploy or integrate computing infrastructure with respect to a process for advanced search of the web service registry for a closest non-exact matching service description of the present invention. Thus, the present invention discloses a process for supporting computer infrastructure, comprising integrating, hosting, maintaining and deploying computer-readable code into a computing system (e.g., computing system 90), wherein the code in combination with the computing system is capable of performing a method for advanced search of the web service registry for the service description that is most closely associated with the service name.

In another embodiment, the invention provides a method that performs the process steps of the invention on a subscription, advertising and/or fee basis. That is, a service provider, such as a Solution Integrator, can offer to create, maintain, support, etc., a process for advanced search of the web service registry for a closest non-exact matching service description of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 7. For example, the memory devices 94 and 95 may be portions of a single memory device rather than separate memory devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. In this specification, the term "memory device" 94, 95 represent a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code 97 for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer program code 97 may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. The term "computer program instructions" is interchangeable with the term "computer program code" 97 in this specification. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for determining a service description that most closely matches a service name provided by a user, said method comprising:

determining, by a processor of a computer system, that the service name provided by the user is not an exact match to a service name in a service registry that comprises service names and associated service descriptions;

said processor generating a ranked service name list by use of a name parser, a dictionary, and a name composer, wherein the ranked service name list comprises at least one alternative service name and a respective rank of each alternative service name of the at least one alternative service name, and wherein the respective rank indicates how closely the alternative service name associated with the respective rank resembles the service name provided by the user;

said processor ascertaining a service description associated with a service name in the service registry that either matches the highest ranked alternative service name in the service name list or if not, matches a second alternative service name which is the next highest ranked alternative service name in the service name list; and said processor communicating the ascertained service description to the user.

2. The method of claim 1, wherein said generating the ranked service name list is performed in response to said determining that the service name provided by the user is not an exact match to a service name in the service registry.

3. The method of claim 1, said ascertaining comprising:
searching the service registry with the at least one alternative service name in a descending order of the respective ranks of the at least one alternative service name.

4. The method of claim 1, said ascertaining comprising:
sorting the ranked service name list by respective rank of each alternative service name; and
searching the service registry for the service description with the at least one alternative service name from a top entry of the ranked alternative service name such that the service description is associated with the highest ranked alternative service name.

5. The method of claim 1, said ascertaining comprising:
searching a top rank by locating a greatest value among all ranks in the ranked service name list; and looking up the service registry for the service description with a first alternative service name associated with the top rank from said searching such that the service description is associated with the highest ranked alternative service name.

6. The method of claim 1, wherein a Service Oriented Architecture (SOA) service registry system that runs on the computer comprises the service registry, the name parser, the dictionary, and the name composer.

7. The method of claim 1, said generating comprising:
creating a constituent word list comprising at least one constituent word that is a respective dictionary word appearing in the service name as a result of parsing the service name into a set of dictionary words by the name parser;
associating a respective weight to each constituent word of the at least one constituent word;
producing a respective synonym list for each constituent word as a result of running the dictionary, the respective synonym list comprising at least one synonym of each constituent word as located in the dictionary;
associating a respective weight to each synonym in the respective synonym list for each constituent word;
composing at least one alternative service name by combining the at least one constituent word from the constituent word list and the at least one synonym from the respective synonym list pursuant to a sequence in the service name by use of the name composer;
calculating a respective rank for the at least one alternative service name by adding the respective weights of all words employed in each alternative service name from said composing;
rendering the ranked service name list by associating the respective rank with each alternative service name.

8. The method of claim 7, wherein the respective weight for each constituent word is predefined in a first range of positive integers greater than one hundred (100), and wherein the respective weight for each synonym of each constituent word is predefined in a second range of zero (0) and positive integers less than five (5) such that a first alternative service name comprising more constituent words ranks higher than a second alternative service name comprising more synonyms in place of constituent words of the service name input by the user.

9. A computer program product comprising:
a computer readable hardware storage device having a computer readable program code embodied therein, said computer readable program code containing instructions that, upon being executed by a processor of a computer system, perform a method for determining a service description that most closely matches a service name provided by a user, said method comprising:
said processor determining that the service name provided by the user is not an exact match to a service name in a service registry that comprises service names and associated service descriptions;
said processor generating a ranked service name list by use of a name parser, a dictionary, and a name composer, wherein the ranked service name list comprise at least one alternative service name and a respective rank of each alternative service name of the at least one alternative service name, and wherein the respective rank indicates how closely the alternative service name associated with the respective rank resembles the service name provided by the user;
said processor ascertaining a service description associated with a service name in the service registry that either matches the highest ranked alternative service name in the service name list or if not, matches a second alternative service name which is the next highest ranked alternative service name in the service name list; and
said processor communicating the ascertained service description to the user.

10. The computer program product of claim 9, wherein said generating the ranked service name list is performed in response to said determining that the service name provided by the user is not an exact match to a service name in the service registry.

11. The computer program product of claim 9, said ascertaining comprising:
searching the service registry with the at least one alternative service name in a descending order of the respective ranks of the at least one alternative service name.

12. The computer program product of claim 9, said ascertaining comprising:
sorting the ranked service name list by respective rank of each alternative service name; and
searching the service registry for the service description with the at least one alternative service name from a top entry of the ranked alternative service name such that the service description is associated with the highest ranked alternative service name.

13. The computer program product of claim 9, said ascertaining comprising:
searching a top rank by locating a greatest value among all ranks in the ranked service name list; and looking up the service registry for the service description with a first alternative service name associated with the top rank from said searching such that the service description is associated with the highest ranked alternative service name.

14. The computer program product of claim 9, wherein a Service Oriented Architecture (SOA) service registry system that runs on the computer comprises the service registry, the name parser, the dictionary, and the name composer.

15. A computer system comprising a processor, a memory coupled to the processor, and a computer readable storage device coupled to the processor, said storage device containing program code configured to be executed by the processor via the memory to implement a method for determining a service description that most closely matches a service name provided by a user, said method comprising:

said processor determining that the service name provided by the user is not an exact match to a service name in a service registry that comprises service names and associated service descriptions;

said processor generating a ranked service name list by use of a name parser, a dictionary, and a name composer, wherein the ranked service name list comprises at least one alternative service name and a respective rank of each alternative service name of the at least one alternative service name, and wherein the respective rank indicates how closely the alternative service name associated with the respective rank resembles the service name provided by the user;

said processor ascertaining a service description associated with a service name in the service registry that either matches the highest ranked alternative service name in the service name list or if not, matches a second alternative service name which is the next highest ranked alternative service name in the service name list; and said processor communicating the ascertained service description to the user.

16. The computer system of claim 15, wherein said generating the ranked service name list is performed in response to said determining that the service name provided by the user is not an exact match to a service name in the service registry.

17. The computer system of claim 15, said ascertaining comprising:

searching the service registry with the at least one alternative service name in a descending order of the respective ranks of the at least one alternative service name.

18. The computer system of claim 15, said ascertaining comprising:

sorting the ranked service name list by respective rank of each alternative service name; and searching the service registry for the service description with the at least one alternative service name from a top entry of the ranked alternative service name such that the service description is associated with the highest ranked alternative service name.

19. The computer system of claim 15, said ascertaining comprising:

searching a top rank by locating a greatest value among all ranks in the ranked service name list; and looking up the service registry for the service description with a first alternative service name associated with the top rank from said searching such that the service description is associated with the highest ranked alternative service name.

20. The computer system of claim 15, wherein a Service Oriented Architecture (SOA) service registry system that runs on the computer comprises the service registry, the name parser, the dictionary, and the name composer.

* * * * *